United States Patent
Kumar et al.

(10) Patent No.: US 10,175,749 B2
(45) Date of Patent: *Jan. 8, 2019

(54) TRANSPARENT DISPLAY APPARATUS AND METHOD THEREOF

(71) Applicant: Samsung Electronics Co., Ltd., Suwon-si, Gyeonggi-do (KR)

(72) Inventors: Nipun Kumar, Suwon-si (KR); Joon-kyu Seo, Seoul (KR); Yeo-jun Yoon, Suwon-si (KR); Young-joon Choi, Uiwang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/840,446

(22) Filed: Dec. 13, 2017

(65) Prior Publication Data

US 2018/0101222 A1 Apr. 12, 2018

Related U.S. Application Data

(63) Continuation of application No. 14/161,118, filed on Jan. 22, 2014, now Pat. No. 9,857,867.

(30) Foreign Application Priority Data

Jan. 22, 2013 (KR) ........................ 10-2013-0007168

(51) Int. Cl.
*G06F 3/00* (2006.01)
*G06F 3/147* (2006.01)
(Continued)

(52) U.S. Cl.
CPC .............. *G06F 3/005* (2013.01); *G06F 3/147* (2013.01); *G06K 9/00671* (2013.01); *G09G 3/20* (2013.01);
(Continued)

(58) Field of Classification Search
CPC ........... G06F 3/005; G06F 3/147; G09G 3/20; G09G 2354/00; G09G 3/3208;
(Continued)

(56) References Cited

U.S. PATENT DOCUMENTS 8,823,741 B2 9/2014 Lee et al.
2002/0044152 A1* 4/2002 Abbott, III .............. G06T 11/00 345/629
(Continued)

FOREIGN PATENT DOCUMENTS

CN 102402287 A 4/2012
CN 102682742 A 9/2012
(Continued)

OTHER PUBLICATIONS

Russian Office Action dated Jan. 23, 2018, issued in the Russian Patent Application No. 2015135388.
(Continued)

*Primary Examiner* — Andrew Sasinowski
(74) *Attorney, Agent, or Firm* — Jefferson IP Law, LLP

(57) ABSTRACT

A transparent display apparatus is provided. The transparent display apparatus includes a transparent display which displays information, a sensor which senses background information in a first direction, and a controller configured to modify a display state of the displayed information on the transparent display based on the sensed background information.

17 Claims, 15 Drawing Sheets

(51) Int. Cl.
  *G06K 9/00* (2006.01)
  *G09G 3/20* (2006.01)
  *G09G 3/3208* (2016.01)
(52) U.S. Cl.
  CPC ... *G09G 3/3208* (2013.01); *G09G 2320/0242* (2013.01); *G09G 2320/0261* (2013.01); *G09G 2320/0626* (2013.01); *G09G 2320/0666* (2013.01); *G09G 2320/0686* (2013.01); *G09G 2340/0464* (2013.01); *G09G 2340/12* (2013.01); *G09G 2340/14* (2013.01); *G09G 2354/00* (2013.01); *G09G 2360/144* (2013.01)
(58) Field of Classification Search
  CPC ... G09G 2320/0242; G09G 2320/0261; G09G 2340/0464; G09G 2360/144; G09G 2340/12; G09G 2320/0686; G09G 2320/0666; G09G 2340/14; G09G 2320/0626; G06K 9/00671
  See application file for complete search history.

(56) References Cited

U.S. PATENT DOCUMENTS

| | | | | |
|---|---|---|---|---|
| 2006/0262140 A1* | 11/2006 | Kujawa | ............... | G06T 19/006 345/633 |
| 2009/0298547 A1* | 12/2009 | Kim | ............... | G06F 1/162 455/566 |
| 2012/0069050 A1* | 3/2012 | Park | ............... | G06F 3/04883 345/632 |
| 2012/0072873 A1* | 3/2012 | Park | ............... | G06F 3/013 715/863 |
| 2012/0154441 A1* | 6/2012 | Kim | ............... | G06K 9/00832 345/633 |
| 2012/0256823 A1 | 10/2012 | Lee et al. | | |
| 2012/0256886 A1* | 10/2012 | Ryu | ............... | G06F 1/1632 345/204 |
| 2013/0009863 A1* | 1/2013 | Noda | ............... | G06F 3/005 345/156 |
| 2014/0204023 A1* | 7/2014 | Kumar | ............... | G06K 9/00671 345/156 |

FOREIGN PATENT DOCUMENTS

| | | |
|---|---|---|
| EP | 2 431 916 A2 | 3/2012 |
| EP | 2 657 929 A2 | 10/2013 |
| EP | 2 720 115 A2 | 4/2014 |
| JP | 2005-258015 A | 9/2005 |
| KR | 10-2011-0136012 A | 12/2011 |
| KR | 10-2012-0029230 A | 3/2012 |
| RU | 72 568 U1 | 4/2008 |
| WO | 2013/154295 A1 | 10/2013 |

OTHER PUBLICATIONS

European Examination Report dated Oct. 15, 2018, issued in European Application No. 14152001.5.

* cited by examiner

FIG. 5B

| | V1 | V2 | ... | Vn | Vn+1 | Vn+2 | Vn+3 | Vn+4 | Vn+5 | Vn+6 | Vn+7 | ... | Vx |
|---|---|---|---|---|---|---|---|---|---|---|---|---|---|
| H1 | 0 | 0 | 0 0 | 0 | 0 | 0 | 0 | 0 | 0 | 0 | 0 | 0 0 | 0 |
| H2 | 0 | 0 | 0 0 | 0 | 0 | 0 | 0 | 0 | 0 | 0 | 0 | 0 0 | 0 |
| ⋮ | 0 | 0 | 0 0 | 0 | 0 | 0 | 0 | 0 | 0 | 0 | 0 | 0 0 | 0 |
| Hm | 0 | 0 | 0 0 | 0 | 0 | 0 | 0 | 0 | 0 | 0 | 0 | 0 0 | 0 |
| Hm+1 | 0 | 0 | 0 0 | 0 | 0 | 0 | 1 | 1 | 0 | 0 | 0 | 0 0 | 0 |
| Hm+2 | 0 | 0 | 0 0 | 0 | 0 | 3 | 3 | 3 | 2 | 0 | 0 | 0 0 | 0 |
| Hm+3 | 0 | 0 | 0 0 | 0 | 1 | 3 | 3 | 3 | 2 | 0 | 0 | 0 0 | 0 |
| Hm+4 | 0 | 0 | 0 0 | 0 | 1 | 3 | 3 | 3 | 2 | 0 | 0 | 0 0 | 0 |
| Hm+5 | 0 | 0 | 0 0 | 0 | 1 | 3 | 3 | 3 | 2 | 0 | 0 | 0 0 | 0 |
| Hm+6 | 0 | 0 | 0 0 | 0 | 1 | 1 | 0 | 0 | 0 | 0 | 0 | 0 0 | 0 |
| Hm+7 | 0 | 0 | 0 0 | 0 | 1 | 1 | 0 | 0 | 0 | 0 | 0 | 0 0 | 0 |
| ⋮ | 0 | 0 | 0 0 | 0 | 1 | 1 | 0 | 0 | 0 | 0 | 0 | 0 0 | 0 |
| | 0 | 0 | 0 0 | 0 | 0 | 0 | 0 | 0 | 0 | 0 | 0 | 0 0 | 0 |
| Hy | 0 | 0 | 0 0 | 0 | 0 | 0 | 0 | 0 | 0 | 0 | 0 | 0 0 | 0 |

500

FIG. 11A
FIG. 11B
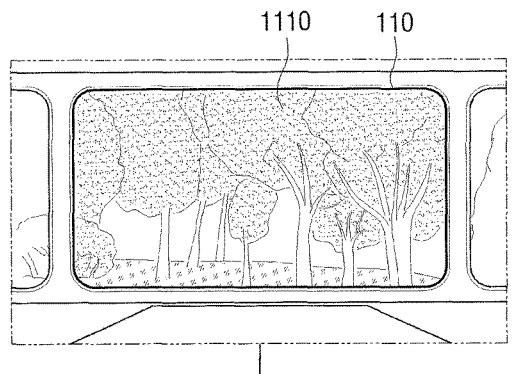
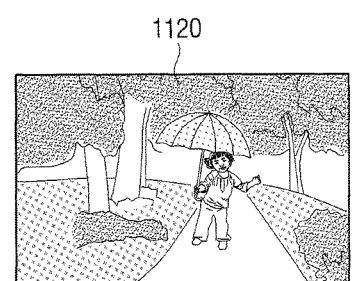
FIG. 11C
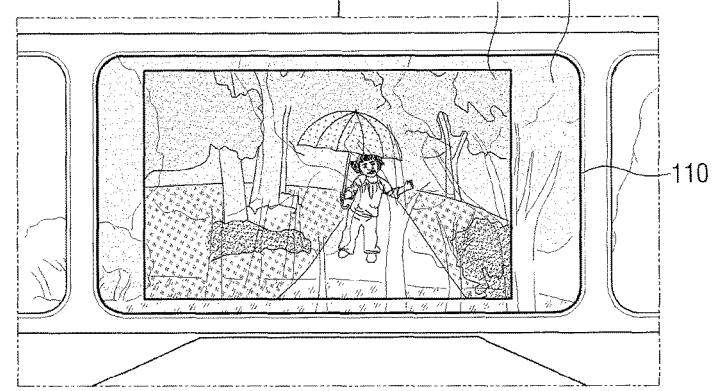
FIG. 11D
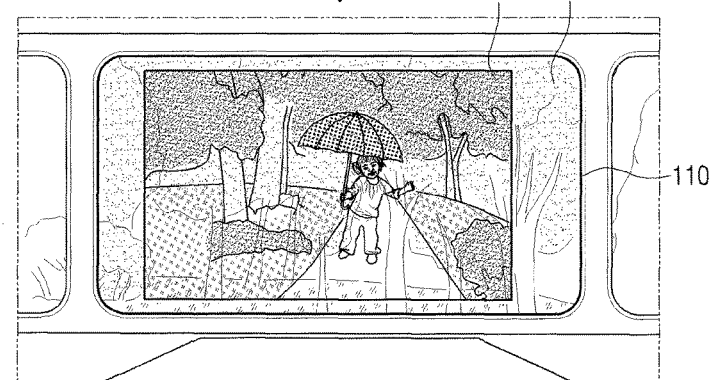

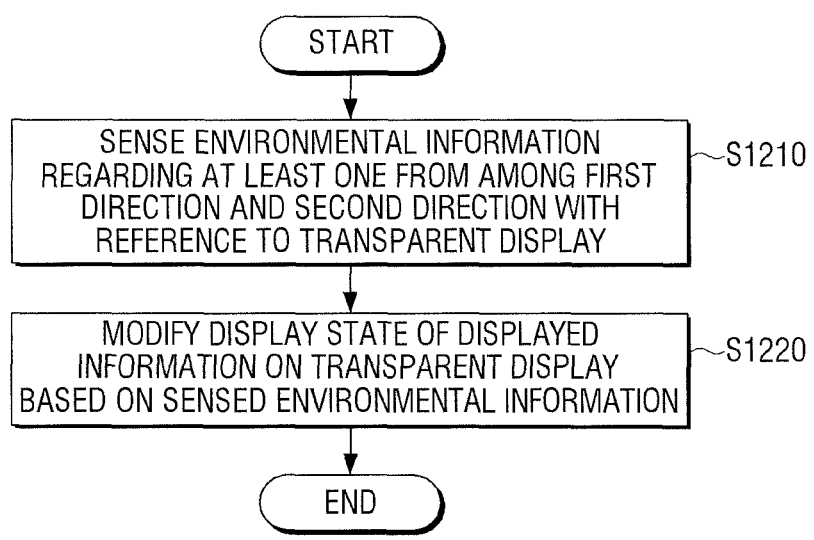

TRANSPARENT DISPLAY APPARATUS AND METHOD THEREOF

CROSS-REFERENCE TO RELATED APPLICATION(S)

This application is a continuation application of prior application Ser. No. 14/161,118, filed on Jan. 22, 2014, and claimed the benefit under 35 U.S.C. § 119(a) of a Korean patent application filed on Jan. 22, 2013 in the Korean Intellectual Property Office and assigned Serial number 10-2013-0007168, the entire disclosure of which is hereby incorporated by reference.

TECHNICAL FIELD

The present disclosure relates to a transparent display apparatus and a display method thereof. More particularly, the present disclosure relates to a transparent display apparatus configured to display information and a display method thereof.

BACKGROUND

Many technical fields have been assisted with use of a variety of display apparatuses thanks to development of electronic technologies. Specifically, discussion regarding next-generation display apparatuses such as transparent display apparatuses has recently been accelerated.

Transparent display apparatuses have transparent properties so that backgrounds of the apparatuses are observable. While the related display panel is produced by using non-transparent conductive compounds such as Silicon (Si) and Gallium Arsenide (GaAs), efforts are continuously made to develop new types of electrical components as various applied fields are developed, thus demanding more than the related display panel can support. One of such efforts thus achieved the transparent display apparatus.

The transparent display apparatus is implemented to include transparent oxide conductive layers and have transparent properties. When the transparent display apparatus is used, a user can see information on the transparent display apparatus screen, while viewing the rear the background behind the apparatus. Thus, it can solve limitations of dimension and time that the related display apparatuses suffer.

The transparent display apparatus may be used conveniently for various usages in various environments. For example, when a shop window is implemented using the transparent display apparatus, advertising texts may pop up as users pass by, thus gaining user's interest. Further, when a veranda window is implemented using the transparent display apparatus at home, a user may view various multimedia contents through the larger size of the veranda window, so that user satisfactions can be enhanced.

The transparent display apparatus is advantageous because of the transparent properties compared to the related display apparatuses. However, transparent displays also have problems due to the transparent properties. For example, the transparent display apparatus may have a problem that information on the screen cannot be clearly distinguished due to the transparent properties.

Therefore, new technology is requested to use the transparent display apparatus more efficiently and variously.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a transparent display apparatus which can efficiently display information on a transparent display based on background information.

In accordance with an aspect of the present disclosure, the transparent display apparatus is provided. The transparent display apparatus includes a transparent display configured to display information, a sensor configured to sense background information in a first direction, and a controller configured to modify a display state of the information displayed on the transparent display based on the sensed background information.

Further, the display state of the information may be at least one of display features of the information and a display position of the information.

Further, the sensor may include an illumination intensity sensor configured to sense illumination intensity regarding the first direction or illumination intensity in a second direction, and wherein the controller may adjust at least one of brightness values and color values of pixel areas corresponding to the displayed information based on the sensed illumination intensity state.

Further, the sensor may include a photographing sensor configured to photograph an object located in the first direction, and a controller may adjust at least one of brightness values and color values of pixel areas corresponding to the displayed information based on color information of the object.

Further, the sensor may include a first sensor configured to sense a position of the object located in the first direction, and a second sensor configured to sense a position of a user located in a second direction. The controller may estimate an area where the object is observed on the transparent display based on the sensed object position and the user position, and adjust at least one of brightness values and color values of pixel areas corresponding to the displayed information on the estimated area.

Further, the controller may estimate an area where the moved object is observed from the user position when the sensed object position is changed, and adjust at least one of brightness values and color values of pixel areas corresponding to the displayed information on the estimated area.

Further, the sensor may include a photographing sensor configured to photograph an object located in the first direction, and the controller may modify and a display position of the displayed information on the transparent display based on color information of the object in the photographed image.

In accordance with another aspect of the present disclosure, a method of controlling a transparent display apparatus is provided. The controlling method includes sensing background information in a first direction via a transparent display, modifying a display state of information displayed in the transparent display based on the sensed background information, and displaying the information with the modified display state.

Herein, the display state of the information may be at least one of display features regarding the information and a display position of the information.

Further, the sensing background information may sense illumination intensity in the first direction, or illumination intensity in a second direction, and the modifying of the display state comprises adjusting at least one of brightness values and color values of pixel areas corresponding to the displayed information based on the sensed illumination intensity state.

Further, the sensing background information may photograph an object located in the first direction, and the displaying may adjust and display at least one of brightness values and color values of pixel areas corresponding to the displayed information based on color information of the object.

Further, the sensing of the background information may comprise sensing a position of the object located in the first direction and a position of a user located in the second direction, and the displaying of the information may include estimating area where the object is observed on the transparent display based on the sensed object position and the user position, adjust and display at least one of brightness values and color values of pixel areas corresponding to the displayed information on the estimated area.

Further, the controlling method may further include estimating an area where the moved object is observed from the user position when the sensed object position is changed, and adjusting at least one of brightness values and color values of pixel areas corresponding to the displayed information on the estimated area.

Further, the sensing of the background information may include photographing an object located in the first direction, and the modifying of the display state includes may include modifying a display position of the displayed information based on color information of the object in the photographed image.

As described above, increased discernment of the information displayed on the transparent display apparatus is provided according to the various embodiments.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, and 5C are views provided to explain a display method which modifies and displays display position of information based on the sensed background information, according to an embodiment of the present disclosure;

FIGS. 7A, 7B, 7C, 7D, 8, 9, 10A, 10B, 10C, 11A, 11B, 11C, and 11D are illustrations provided to explain the display method according to various embodiments of the present disclosure; and FIG. 12 is a flowchart illustrating a method of the transparent display apparatus according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
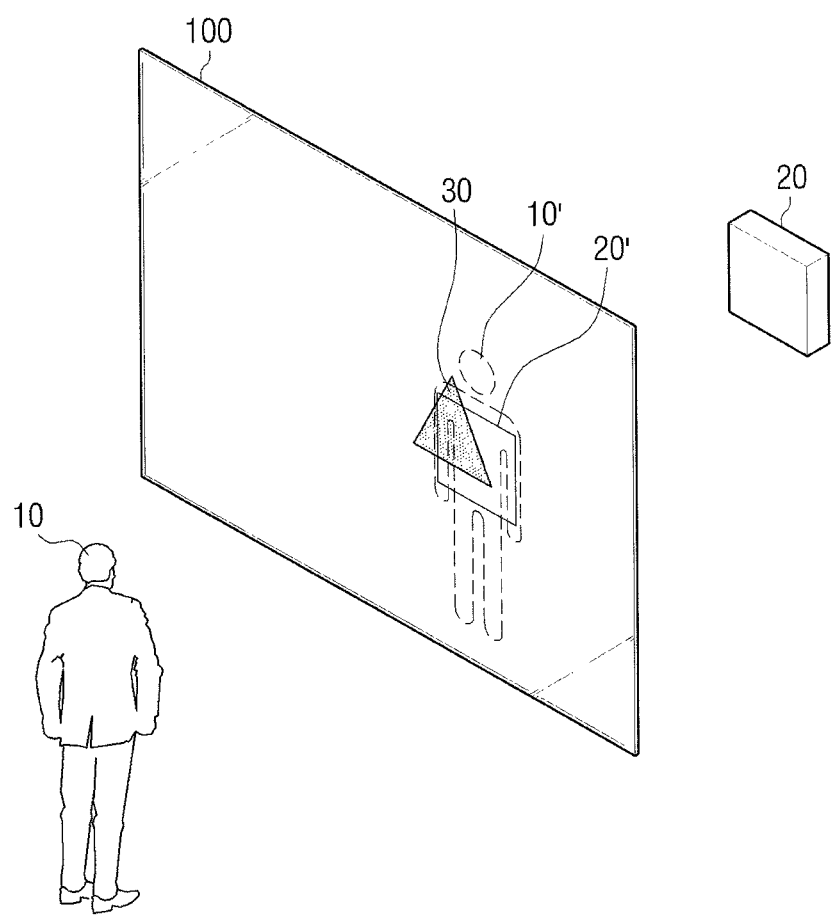
FIG. 1 is an illustration of a transparent display apparatus according to an embodiment of the present disclosure.

FIG. 1 is an illustration of a transparent display apparatus according to an embodiment of the present disclosure.

Referring to FIG. 1, the transparent display apparatus 100 is implemented so that the display screen is transparent and a background can be observed. Therefore, when the displayed information overlaps with the background, information may not be clearly viewed, thus deteriorating discernment.

For example, as illustrated in FIG. 1, the transparent display apparatus 100 may display information 30 while an object 20 is behind transparent display apparatus 100. In this case, the displayed information 30 may be less clear due to the presence of the object 20.

According to an embodiment of the present disclosure, the transparent display apparatus 100 modifies a display state of the displayed information based on the background of the transparent display apparatus 100. For example, display features such as color, brightness, size and shape or display position to be displayed on the transparent display apparatus 100 may be modified and displayed.

Specifically, the transparent display apparatus 100 senses a position of a user 10 and a position of the object 20, and estimates an area where the object 20 is observed on the transparent display apparatus 100 when the object 20 is viewed from the user position. For the sake of clarity, the area where the object is observed by the user will be referred to as the 'look-through area' for convenient explanation. When information is displayed on the look-through area, discernability of the information deteriorates due to the position of the object. Therefore, the look-through area may be additionally referred to as a 'reduced discernability area'.

In this case, the transparent display apparatus 100 may divide the area of the transparent display into divided areas of a preset size in order to estimate the look-through area. The transparent display apparatus 100 may estimate an area corresponding to the position of the object 20 to be the look-through area among the virtual divided areas. In this case, the transparent display apparatus 100 may estimate the look-through area by considering a relationship between a mapping area 10' where the position and the shape of the user 10 are mapped on the display surface and another mapping area 20' where the position and the shape of the object 20 are mapped on the display surface. For example, overlapped area 10'∩20' where the two mapping areas overlap with each other may be estimated to be the look-through area.

The transparent display apparatus 100 may map the virtual divided areas with matrix tables in order to correctly estimate each mapping area. In this case, whether there is overlapping may be determined by considering a relationship between cells mapped with the look-through area of the object within the matrix tables and cells mapped with area where the information will be displayed.

When the two areas are determined to be overlapping, the transparent display apparatus 100 may adjust the display of the information to increase legibility. Thus, when the look-through area is estimated, the transparent display apparatus 100 may modify the information 30 displayed on the look-through area into a state free of deteriorating discernability, and display the modified information. Specifically, brightness values and color values of pixel areas corresponding to the information 30 may be adjusted. For example, when the information 30 is text, various display features such as size, color, brightness, thickness, or font may be adjusted. Further, display position of the information 30 may be adjusted. In this case, the direction and the distance to move the information 30 may be determined by considering overlapping degree between the look-through area and the displayed position of the information 30, position of the overlapping area, and position of another area where the discernability may not be deteriorated. In this case, the transparent display apparatus 100 compares features of the object 20 and display features of the information 30. For example, size of the overlapping area, color of the overlapping area, distance between the object and the transparent display apparatus 100, and distance between a user and the transparent display apparatus 100 may be determined, and display features of the information may be modified according to the results.

Specifically, when a color of the object on the overlapping area is similar to display color of the information, the display color of the information is modified and displayed into another color.

Further, when the text information is difficult to be discerned due to the background information, an image format may be implemented in which the same information as the text information is provided.

Further, when a user is watching the transparent display apparatus 100 at a remote distance, size of the display area regarding the information may be expanded and displayed. On the contrary, when a user is watching at a closer distance, the display area of the information may be reduced and displayed. When the overlapping area is large, a moving distance of the display position regarding the information becomes longer. Thus, layout of the information may be modified in a suitable format for the extended direction. Further, when the object is located at a remote distance, the expanded image regarding the object may be provided as information.

Figure 2:
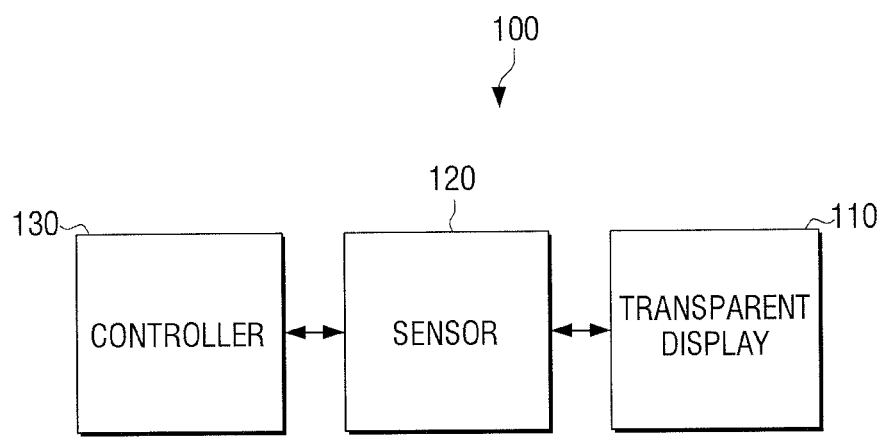
FIG. 2 is a block diagram of a transparent display apparatus according to an embodiment of the present disclosure.

FIG. 2 is a block diagram of the transparent display apparatus according to an embodiment of the present disclosure.

Referring to FIG. 2, the transparent display apparatus 100 includes a transparent display 110, a sensor 120, and a controller 130.

The transparent display 110 displays information such as images, text, contents playing screen, application implementing screen, web browser screen, or various graphic objects.

The transparent display 110 may be implemented to be a variety of forms such as transparent Liquid Crystal Display (LCD), transparent Organic Light-Emitting Diode (OLED), transparent Thin-Film ElectroLuminescent panel (TFEL), or a projection type. The following will explain various embodiments regarding constitution of the transparent display 110.

Various Embodiments of Transparent Display Constitution

The transparent LCD is a transparent display apparatus which does not require backlighting, unlike the currently used LCD devices, and may be implemented using a pair of polarized panels, optical films, transparent thin film transistors, and transparent electrodes. In the transparent LCD device, transparency deteriorates compared to the polarized panel and the optical film, and light efficiency deteriorates because surrounded lights are used instead of the backlighting. However, it may nevertheless be advantageous to implement the transparent display using the transparent LCD. The transparent TFEL uses Alternating Current inorganic Thin Film EL display (AC-TFEL) including transparent electrodes, inorganic fluorescent materials, and insulating layers. AC-TFEL is a display that generates lights by exciting the fluorescent materials with the accelerated electrons passing through within the inorganic fluorescent. When the transparent display 110 is implemented to be transparent TFEL type, the controller 130 may determine display position of the information by adjusting the electrons to project on proper positions. Because the inorganic fluorescent materials and the insulating layers have transparent properties, high quality of transparent display can be implemented.

The transparent OLED indicates transparent display apparatus to use OLED that can emit lights internally. Because the organic light-emitting layers are transparent, the transparent OLED may be implemented to be the transparent display apparatus when both sides of electrodes are used to be transparent electrodes. The OLED emits lights as the electrons and the electron holes are injected from the both sides of the organic light-emitting layers and are coupled within the organic light-emitting layers. The transparent OLED device injects the electrons and the electron holes at the requested positions based on the foregoing and the display information.

Figure 3:
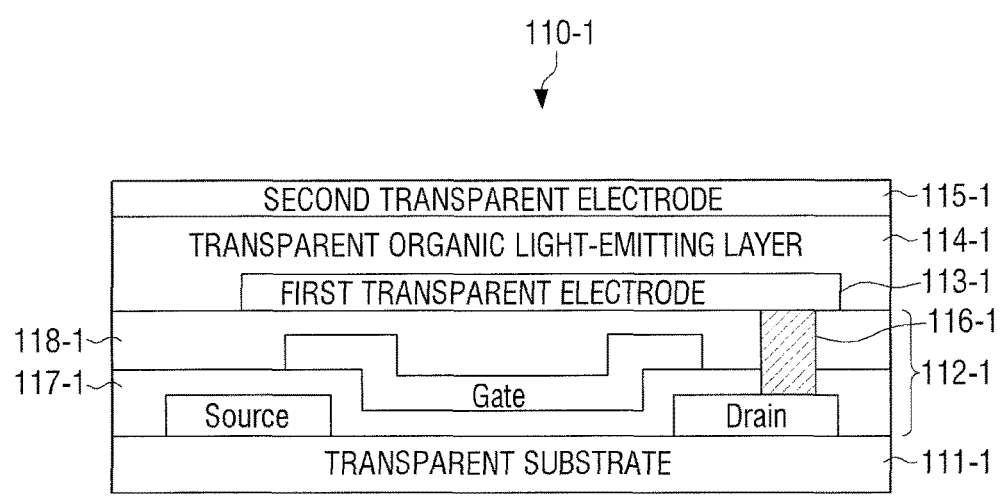
FIG. 3 is block diagram of a transparent display which is implemented by a transparent Organic Light-Emitting Diode (OLED) type according to an embodiment of the present disclosure.

FIG. 3 is block diagram of a transparent display which is implemented by a transparent OLED type according to an embodiment of the present disclosure.

Referring to FIG. 3, the transparent display 110-1 includes a transparent substrate 111-1, a transparent transistor layer 112-1, a first transparent electrode 113-1, a transparent organic light-emitting layer 114-1, a second transparent electrode 115-1, and a connecting electrode 116-1.

The transparent substrate 111-1 may use polymer materials such as plastics and other materials such as glass that have transparent properties. Materials of the transparent substrate 111-1 can be determined according to the environment where the transparent display apparatus 100 is applied. For example, because polymer materials have advantages of lightness and flexibility, they may be used in mobile display apparatuses, and glass may be used in building windows.

The transparent transistor layer 112-1 may include a transistor which is produced by substituting non-transparent silicon of the related thin-film transistors with transparent materials such as transparent zinc oxide or oxide titanium. Within the transparent transistor layer 112-1, source, gate, drain and various conductive layers 117-1, 118-1 may be provided and the connecting electrode 116-1 to electrically connect the drain with the first transparent electrode 113-1 may be provided. Although FIG. 3 only illustrates one transparent transistor constituted with the source, the gate, and the drain within the transparent transistor layer 112-1, a plurality of transparent transistors which are evenly distributed on the whole area of the display surface may be provided when being implemented. The controller 130 may display information by applying controlling signals to each gate of the transistors within the transparent transistor layer 112-1 for driving a corresponding transparent transistor.

The first transparent electrode 113-1 and the second transparent electrode 115-1 are arranged on the opposite direction with reference to the transparent organic light-emitting layer 114-1. The first transparent electrode 113-1, the transparent organic light-emitting layer 114-1, and the second transparent electrode 115-1 form transparent organic light-emitting diodes.

The transparent organic light-emitting diodes are divided into passive matrix OLED and active matrix OLED according to driving methods. A Passive Matrix Organic Light-Emitting Diode (PMOLED) has a structure in which crossing areas of the first and the second transparent electrodes 113-1, 115-1 form pixels. Meanwhile, an Active Matrix Organic Light-Emitting Diode (AMOLED) has a structure in which Thin Film Transistor (TFT) drive each pixel. FIG. 3 illustrates an example AMOLED display.

The first transparent electrode 113-1 and the second transparent electrode 115-1 respectively include a plurality of line electrodes that are arranged orthogonally with each other. For example, when the line electrodes of the first transparent electrode 113-1 are arranged in horizontal directions, the line electrodes of the second transparent electrode 115-1 are arranged in vertical directions. Thereby, a plurality of crossing areas are formed between the first transparent electrode 113-1 and the second transparent electrode 115-1. In each crossing area, the transparent transistor is connected as illustrated in FIG. 3.

The controller 130 generates electric potential differences in each crossing area by using the transparent transistor. Light emission is performed by injecting and coupling the electrons and the electron holes from each electrode toward the transparent organic light-emitting layer 114-1 within the crossing area where electric potential differences are made. Meanwhile, light emission is not performed on the crossing area where electric potential differences are not made, and thus, the rear background is looked through transparently.

Indium Tin Oxide (ITO) may be used for the first and the second transparent electrodes 113-1, 115-1. Further, new materials such as graphene may be used, which is the material in which carbon is connected with each other to form bee hive shaped planar structure and includes transparent properties. Additionally, the transparent organic light-emitting layer 114-1 may be implemented with various materials.

Meanwhile, as described above, in addition to transparent LCD type, transparent TFEL type, and transparent OLED type, the transparent display 110 may be implemented to be a projection type. The projection type involves a method to project and display images toward the transparent screen such as Head Up Display (HUD).

Referring back to FIG. 2, the sensor 120 senses at least one background information in a first direction and a second direction with reference to the transparent display 110. Herein, the first direction and the second direction may be defined to be a user direction and the opposite direction to the user based on the transparent display 110. Further, the background information may include illumination intensity information regarding corresponding direction and background information regarding corresponding direction. In this case, the background information may include information regarding objects located in a corresponding direction. Thereby, the sensor 120 may be implemented to be any suitable type of sensor or combination of sensors such as an illumination intensity sensor and a photographing sensor.

The controller 130 may control the display state of the displayed information on the transparent display 110 based on the sensed background information by the sensor 120.

Specifically, the controller 130 may adjust brightness values and color values of pixel areas corresponding to the displayed information on the transparent display 110 based on the sensed illumination intensity information by the sensor 120. For example, when the information shows weak discernability of the display because the illumination intensities of both the front side and the back side are higher, the controller 130 may reduce and display the brightness of pixel areas corresponding to the information, so that the displayed information can be recognized more clearly.

Further, the controller 130 may modify display position of the displayed information on the transparent display 110 based on the sensed background information. For example, when information is displayed while an object is located behind the transparent display apparatus 100, the controller 130 may modify the display state of the information based on position of the object, shape and color of corresponding object, and display the modified information. Herein, the object is any item that can be viewed through the transparent display apparatus such as a variety of goods that can be sold, animals and plants, furniture, wall, wall paper, and so on.

Various Embodiments Regarding Sensing Shape and Color of Object

For example, the sensor 120 may photograph background images by using a photographing device such as camera, analyze the photographed background images, and recognize object features in the background images (e.g., object colors, texts written on the object, or images drawn or added on the object). Regarding the object colors, edges may be extracted from the photographed images and colors within the extracted edges may be extracted. The texts and the images may be extracted by using text reading or image reading algorithms. When such colors, texts, and images are extracted, the transparent display apparatus 100 may provide information regarding corresponding object to the controller 130.

Further, the sensor 120 may extract the average color of the rear background from the photographed images. For example, the sensor 120 may extract the average value of the various colors when colors of the rear background of the transparent display 110 are diverse.

The controller 130 may adjust color, brightness, or size of the displayed information on the transparent display 110 based on the shape and the color of the rear background, and the shape and the color of the object 20 included in the rear background.

Various Embodiments Regarding Sensing Positions of Object and User

The sensor 120 may sense object position included in the rear background and also sense a user position located on the front side in order to estimate the above described look-through area.

For example, the sensor 120 may sense the object position included in the rear background from the photographed images.

In another example, the sensor 120 may sense intensity of light emitting from the back side by using the optical sensor, and sense the object position by analyzing the intensity distribution of the light.

In yet another example, the object position may be determined by inputting the object position by a user or a manager. In this case, the sensor 120 may include various inputting means such as touch screen, keyboard, mouse, joy stick, touch pad, and button. A user or a manager can directly determine the object position on the back side through the inputting means.

Further, the sensor 120 may extract the user position located on the front side of the transparent display apparatus 100. In this case, as described above, the user position may be extracted by using the photographing device or the optical sensor.

As described above, the method sensing the object position included in the rear background and the user position can be implemented differently according to various embodiments.

The controller 130 estimates area where the object 20 is observed on the transparent display 110 when the user 10 views the transparent display 110, i.e., the look-through area based on the positions of the object 20 included in the rear background and the user 10 which are respectively sensed in the sensor 120.

Further, the controller 130 may confirm whether the information 30 included in the look-through area is displayed on the transparent display 110 and determine whether the display position of the confirmed information is moved toward another area.

Various Embodiments Regarding Sensing Illumination Intensity

Meanwhile, the sensor 120 may sense illumination intensity at the front side where a user is located and the back side where the rear background is located. For example, a CaDmium Sulfide (CDS) illumination intensity sensor may sense illumination intensity regarding both directions by being established on the both sides of the transparent display apparatus 100. In this case, the illumination intensity sensor can be established on at least one preset area of the both sides in the transparent display apparatus 100; however, they may be established on the pixel unit of the both sides. For example, a Complementary Metal Oxide Semiconductor (CMOS) sensor may implement the illumination intensity sensor so as to correspond to the size of the transparent display 110 and the illumination intensity state of each area or each pixel may be measured.

Figure 4:
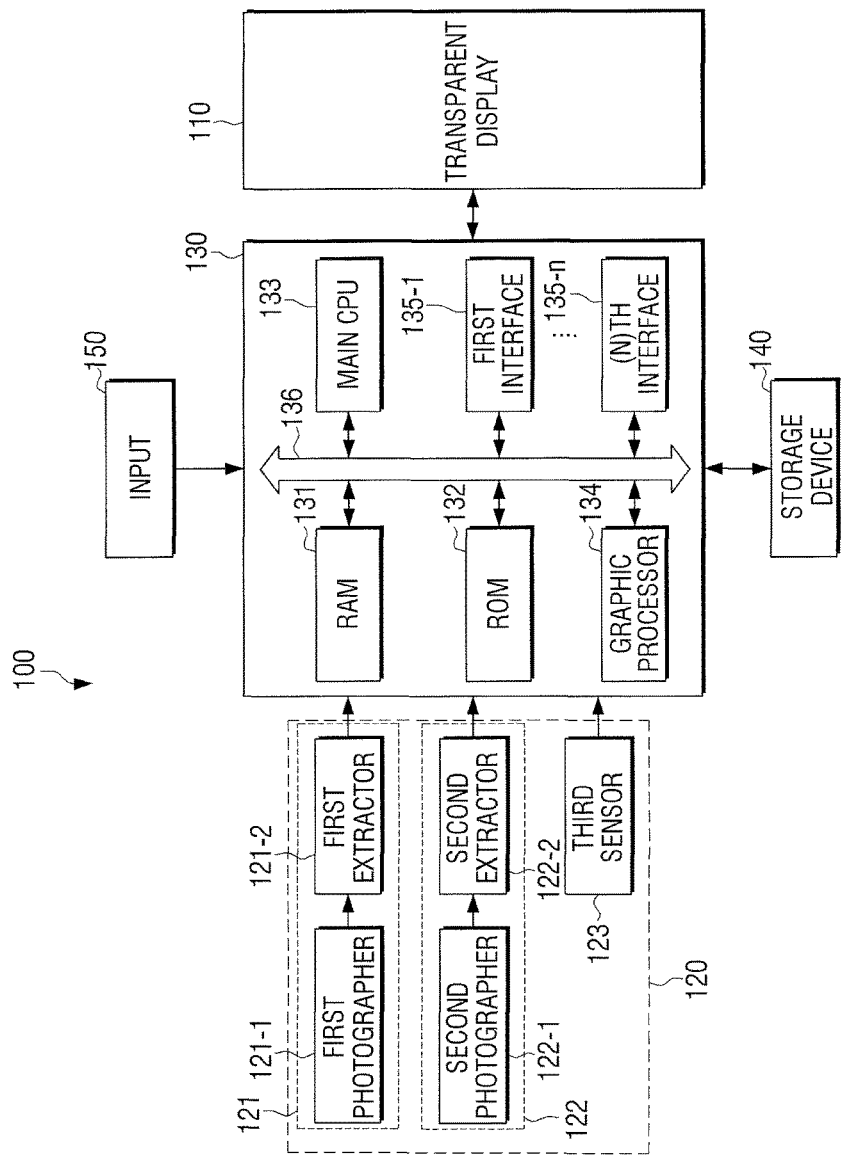
FIG. 4 is a block diagram of a transparent display apparatus according to an embodiment of the present disclosure.

FIG. 4 is a block diagram of the transparent display apparatus according to an embodiment of the present disclosure.

Referring to FIG. 4, the transparent display apparatus 100 includes the transparent display 110, a first sensor 121, a second sensor 122, a third sensor 123, the controller 130, a storage device 140, and an input 150.

The first sensor 121 senses a position of an object located in the first direction on the transparent display apparatus 100. The second sensor 122 senses position of a user located in the second direction on the transparent display apparatus 100. Further, the third sensor 123 senses illumination intensity in the first and/or the second direction of the transparent display apparatus 100. The controller 130 may display information on the transparent display 110 by considering the sensed object position and user position, or display information on the transparent display 110 by considering the sensed illumination intensity information.

The first sensor 121 and the second sensor 122 may sense positions of the object and the user with various methods. Various embodiments of the sensing method in the first sensor 121 and the second sensor 122 will be explained below.

The first sensor 121 senses position of the object. The first sensor 121 includes a first photographer 121-1 and a first extractor 121-2.

The first photographer 121-1 photographs in the first direction of the transparent display apparatus 100. Thereby, it may photograph at least one item including the object located in the first direction. For convenient explanation, the image photographed by the first photographer 121-1 will be referred as the 'rear image'.

The first extractor 121-2 extracts edges of each item by using each image pixel of the rear image. Extracting edges may be performed according to various extraction algorithms.

For example, the first extractor 121-2 divides the rear image on an m*n pixel basis and sections the image into a plurality of blocks. The first extractor 121-2 extracts a representative value of each block. The representative value may be the average pixel value of whole pixels within corresponding block, the highest pixel value among the pixel values within corresponding block, and the total pixel value adding up all the pixel values. The first extractor 121-2 confirms whether there are blocks arranged consecutively while having similar representative values by comparing the extracted representative values. Blocks included in an area where the same object is photographed have a close range of representative values.

When the consecutive similar blocks are confirmed, the first extractor 121-2 extracts blocks corresponding to boundary points between blocks having different representative values from the confirmed similar blocks as edges.

Further, the first extractor 121-2 distinguishes the object among the items photographed by the first photographer 121-1 by using the extracted edges, and extracts the distinguished object positions and the distinguished area on the photographed images. For example, when the extracted edges form a closed curve, the first extractor 121-2 extracts positions of corresponding blocks to the closed curve among whole blocks deemed to be the object position. Further, the first extractor 121-2 extracts the distinguished area where the object is distinguished from the whole area of the transparent display 110 by comparing the rear image and the whole area of the transparent display 110.

The second sensor 122 includes a second photographer 122-1 and a second extractor 122-2. The second photographer 122-1 photographs in the second direction with reference to the transparent display apparatus 100. Thereby, the front image is obtained.

The second extractor 122-2 extracts a position of the user by analyzing the photographed front image in the second photographer 122-1. The extracting of the user position may be implemented similar to the extracting the object position of the first extractor 121-2.

Further, the user position can be correctly extracted according to information the user previously registered or provided through a user terminal apparatus such as a near field wireless communication module or a tag associated with the user.

The third sensor 123 senses illumination intensity in any of the first direction and the second direction. Herein, the third sensor 123 may be implemented to be illumination intensity sensor, InfraRed (IR) sensor, and a CMOS sensor. In this case, the illumination intensity sensor may use various types of sensors such as photoelectric cells and a photoelectric tube that may be used to measure very low level of illumination intensity.

The controller 130 determines the look-through area based on the object position and the user position respectively sensed in the first and the second sensors 121, 122.

The controller 130 divides the area of the transparent display 110 into a plurality of areas and determines the look-through area where the object is observed from the user position. The controller 130 may modify display attributes of displayed information within the look-through area by comparing the information displayed within the look-through area and features of the photographed image in the first photographer 121-1. For example, the controller 130 may modify brightness or color of the pixel area where information is displayed, and modify size and display position of the information.

Further, the controller 130 may modify brightness and color of pixel areas of the transparent display 110 or the area where information is displayed. In this case, the controller 130 may adjust brightness according to features of the display components (e.g., LCD, OLED) constituting the display 110.

Meanwhile, the above embodiment describes that the background information sensed in the first sensor 121 to the third sensor 123 are used separately. However, the background information sensed in each sensor may be jointly used.

Meanwhile, the controller 130 includes a Random Access Memory (RAM) 131, a Read Only Memory (ROM) 132, a main Central Processing Unit (CPU) 133, a graphic processor 134, first to (n)th interfaces 135-1~135-*n*, and a bus 136.

The RAM 131, the ROM 132, the main CPU 133, the graphic processor 134, and the first to (n)th interfaces 135-1~135-*n* may be connected with each other through the bus 136.

The first to (n)th interfaces 135-1 to 135-*n* connect with the above described various units. One of the interfaces may be a network interface for connecting with an external device through a network.

The main CPU 133 performs a booting process by accessing to the storage device 140 and using a stored Operating System (O/S) in the storage 140. Further, the main CPU 133 performs various operations by using various programs, contents and data stored in the storage device 140.

The ROM 132 stores a command set for system booting. When a turn-on command is inputted and electrical power is provided, the main CPU 133 copies the stored O/S in the storage device 140 to RAM 131 and boots the system by executing the O/S. When booting completes, the main CPU 133 copies the various stored application programs in the storage device 140 to RAM 131 and performs various operations by implementing the copied application programs in RAM 131.

The graphic processor 134 generates screens including various objects such as icons, images and texts by using a calculator (not illustrated) and a renderer (not illustrated). The calculator (not illustrated) calculates feature values such as coordinate values, shape, size, and color according to layouts of the screens. The renderer (not illustrated) generates various layouts of screens including objects based on the feature values calculated in the calculator (not illustrated). The screens generated in the renderer (not illustrated) are displayed within display area of the transparent display 110.

The storage device 140 may store images respectively photographed in the first photographer 121-1 and the second photographer 122-1, information regarding object positions and user positions, other various information, various settings information provided by the user that are related to the operation of the transparent display apparatus 100, the O/S, and various application programs.

The input 150 is configured to receive various incoming user commands related with operation of the transparent display apparatus 100. The input 150 may be implemented in a form such as a touch screen implemented on the transparent display 110, buttons provided on the main body of the transparent display apparatus 100, and an Input/Output (I/O) interface receiving various incoming signals from an external input device such as keyboard and mouse. The user may selectively enable a function of moving the information marking position through the input 150, or establish conditions to move the information marking position or the modifying display attributes when being moved.

Figure 5A:
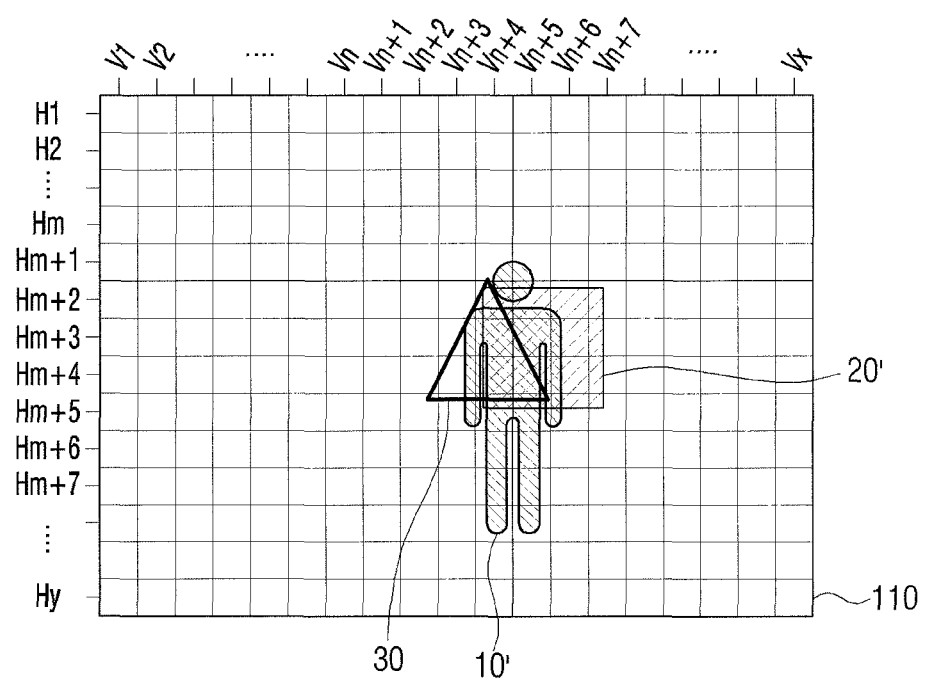
Figure 5C:
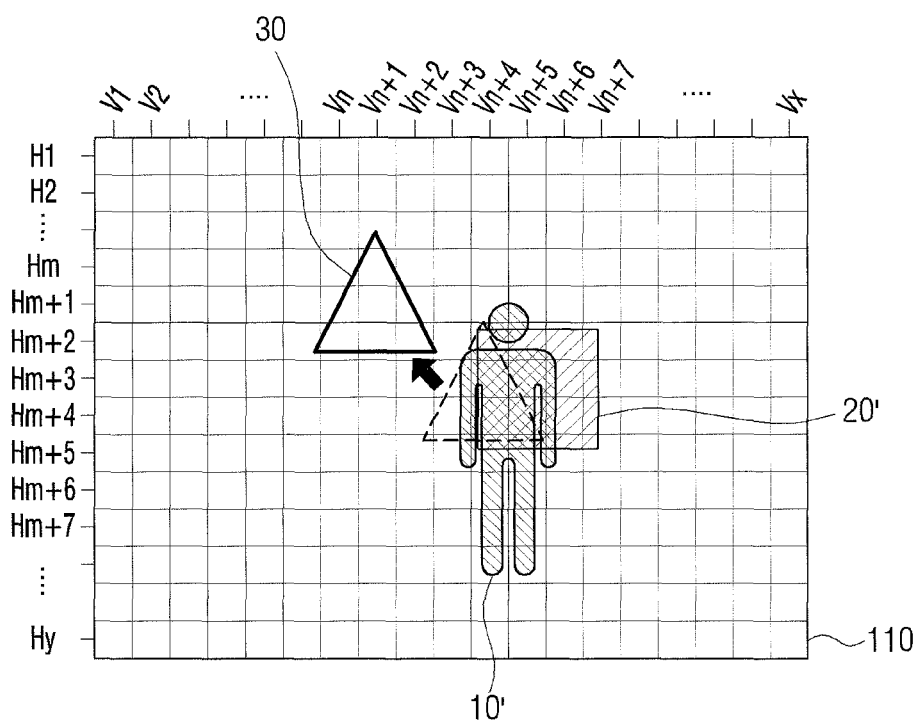

FIGS. 5A, 5B, and 5C are views provided to explain a method for modifying display position of information based on the sensed background information and displaying the same, according to an embodiment of the present disclosure.

Referring to FIG. 5A, a view is provided to illustrate that the whole area of the transparent display 110 is divided into a plurality of blocks. Specifically, in FIG. 5A, the whole area of the transparent display 110 is divided into virtual divided areas including a plurality of vertical lines V1~Vx and a plurality of horizontal lines H1~Hy. The virtual divided areas may be implemented in a matrix format.

When high resolution is requested, each cell of the matrix may be implemented on one pixel basis, however, each cell may include several pixels to reduce computation load. For example, the whole area of the transparent display 110 may be divided into 4 sections, 6 sections, 9 sections, and 12 sections.

The controller 130 matches the user position and the object position respectively corresponding to areas of the transparent display 110. In FIG. 5A, the object 20 is looked through on area of (Vn+4, Hm+2), (Vn+5, Hm+2), (Vn+6, Hm+2), (Vn+7, Hm+2), (Vn+4, Hm+3), (Vn+5, Hm+3), (Vn+6, Hm+3), (Vn+7, Hm+3), (Vn+4, Hm+4), (Vn+5, Hm+4), (Vn+6, Hm+4), (Vn+7, Hm+4), (Vn+4, Hm+5), (Vn+5, Hm+5), (Vn+6, Hm+5) and (Vn+7, Hm+5). The area where the object 20 is perceived on the transparent display 110 is illustrated by the object matching area 20'.

Meanwhile, the user position is denoted by the area of (Vn+3, Hm+1), (Vn+4, Hm+1), (Vn+5, Hm+1), (Vn+6, Hm+1), (Vn+3, Hm+2), (Vn+4, Hm+2), (Vn+5, Hm+2), (Vn+6, Hm+2), (Vn+3, Hm+3), (Vn+4, Hm+3), (Vn+5, Hm+3), (Vn+6, Hm+3), (Vn+3, Hm+4), (Vn+4, Hm+4), (Vn+5, Hm+4), (Vn+6, Hm+4), (Vn+3, Hm+5), (Vn+4, Hm+5), (Vn+5, Hm+5), (Vn+6, Hm+5), (Vn+4, Hm+6), (Vn+5, Hm+6), (Vn+4, Hm+7), (Vn+5, Hm+7), (Vn+4, Hm+8) and (Vn+5, Hm+8). The area where the user 10 looks through on the transparent display 110 is illustrated by reference numeral, 10'. Further, FIG. 5A illustrates that the information 30 is marked on the overlapping area between the object matching area 20' and the user matching area 10'.

The controller 130 respectively records the object position sensed in the first sensor 121 and the user position sensed in the second sensor 122 on the matrix tables stored in the storage device 140. Thereby, the overlapping part between the two positions is determined to be look-through area.

Further, the controller 130 may determine the object matching area 20' by vertically projecting the object onto the transparent display 110 and the user matching area 10' by vertically projecting the user onto the transparent display 100. In this case, the area where the object is viewed from the user position, i.e., the look-through area, may be formed in the object matching area 20' and the user matching area 10'. The controller 130 may determine the look-through area according to the distance from the object to the transparent display 110, the distance from the user to the transparent display 110, and the ratio of the distances. Thus, the controller 130 may determine the above-described object matching area 20' by considering the object shape and the object size based on the point vertically connecting the surface of the transparent display 110 with the object. Further, the user matching area 10' may be determined by considering the user shape and the user size based on the point vertically connecting the surface of the transparent display 110 with the user. Therefore, when the object and the user are located symmetrically with each other and vertically from the surface of the transparent display 110, the overlapping area between the user matching area 10' and the object matching area 20' is the look-through area.

Meanwhile, when the object and the user are respectively located at 45° angle from each other based on the transparent display 110, the center area between the user matching area 10' and the object matching area 20' corresponds to the look-through area. Thereby, the look-through area may be calculated with the distance and the angle between the user and the object.

Meanwhile, when changes in the user position or the object position are sensed or a new user or a new object is sensed, the controller 130 refreshes the matrix tables according to the sensing results.

Referring to FIG. 5B, one example is illustrated of the matrix tables stored in the storage device 140 or RAM 131. Referring to FIG. 5B, the matrix table 500 may be implemented in the same manner as that of FIG. 5A, by dividing the transparent display 110 into a plurality of areas. Thus, the matrix table 500 may include a plurality of vertical lines V1~Vx and a plurality of horizontal lines H1~Hy, and data may be respectively recorded on the cells which are crossed with the vertical lines and the horizontal lines.

In FIG. 5B, a basic value is recorded on each cell within the matrix table 500, a preset first value is recorded on a corresponding cell to the object position among the cells and a preset second value is recorded on corresponding cell to the user position among the cells. Although FIG. 5B establishes the basic value, the first value and the second value to be 0, 1, and 2, this is merely one of various embodiments for convenience in explanation, and the values are not limited thereto.

The controller 130 records 2 on cells of (Vn+4, Hm+2), (Vn+5, Hm+2), (Vn+6, Hm+2), (Vn+7, Hm+2), (Vn+4, Hm+3), (Vn+5, Hm+3), (Vn+6, Hm+3), (Vn+7, Hm+3), (Vn+4, Hm+4), (Vn+5, Hm+4), (Vn+6, Hm+4), (Vn+7, Hm+4), (Vn+4, Hm+5), (Vn+5, Hm+5), (Vn+6, Hm+5) and (Vn+7, Hm+5) within the matrix table 500 according to the sensing results in the first sensor 121.

Further, the controller 130 records 1 on cells of (Vn+3, Hm+1), (Vn+4, Hm+1), (Vn+5, Hm+1), (Vn+6, Hm+1), (Vn+3, Hm+2), (Vn+4, Hm+2), (Vn+5, Hm+2), (Vn+6, Hm+2), (Vn+3, Hm+3), (Vn+4, Hm+3), (Vn+5, Hm+3), (Vn+6, Hm+3), (Vn+3, Hm+4), (Vn+4, Hm+4), (Vn+5, Hm+4), (Vn+6, Hm+4), (Vn+3, Hm+5), (Vn+4, Hm+5), (Vn+5, Hm+5), (Vn+6, Hm+5), (Vn+4, Hm+6), (Vn+5, Hm+6), (Vn+4, Hm+7), (Vn+5, Hm+7), (Vn+4, Hm+8) and (Vn+5, Hm+8) within the matrix table 500 according to the sensing results in the second sensor 122.

The controller 130 records 3 which is a result value of adding 1 and 2 from the cells of (Vn+4, Hm+2), (Vn+5, Hm+2), (Vn+6, Hm+2), (Vn+4, Hm+3), (Vn+5, Hm+3), (Vn+6, Hm+3), (Vn+4, Hm+4), (Vn+5, Hm+4), (Vn+6, Hm+4), (Vn+4, Hm+5), (Vn+5, Hm+5) and (Vn+6, Hm+5), which form the overlapping area of the two above areas.

However, this is merely one of various embodiments and is not to be limited thereto. Thus, instead of adding the two above values, a third value may be recorded on cells corresponding to the overlapping area between the two areas in order to indicate that the cells correspond to the overlapping area.

The controller 130 compares the area where the information 30 is displayed on the transparent display 110 with the matrix table 500. Thereby, when the cells where 3 is recorded (corresponding to intersection area) among the cells within the matrix table partly overlap with the information marking area, display position of the information 30 is moved. According to various embodiments, display position may be moved when the information marking area places on the cells where any values of 1, 2 and 3 is recorded (corresponding to union area).

Referring to FIG. 5C, the information marking position is modified by the controller 130. Specifically, the information 30 marked on the overlapping area with the cells where any one of 1, 2 and 3 is recorded within the matrix table is moved toward area of (Vn+1, Hm−1), (Vn, Hm), (Vn+1, Hm), (Vn+2, Hm), (Vn, Hm+1), (Vn+1, Hm+1), (Vn+2, Hm+1), (Vn−1, Hm+2), (Vn, Hm+2), (Vn+1, Hm+2), (Vn+2, Hm+2) and (Vn+3, Hm+2).

The controller 130 may also determine the moving distance and the moving direction of the information 30 based on the position of the overlapping area between the look-through area and the information marking area and distances from the other surrounded areas where the discernibility may not be deteriorated. FIG. 5C illustrates that the information is displaced and displayed from a certain distance of the look-through area after being shifted toward a left upper side by 3 or 4 areas from the original position; however, it may not be limited thereto. The information 30 may be displayed as close to the original position as possible by moving toward an area nearest to the look-through area.

Further, the moving direction of the information marking area may be previously determined by a manager or a user. For example, the information marking area may be established to move in a certain direction such as up, down, left, right and a diagonal direction with reference to the object position, the user position and the visible range of the user.

Although FIG. 5B illustrates that the object position, the user position and the information position are comprehensively determined by using one matrix table 500, matrix tables may be respectively created per object, user and information, and the look-through area may be determined by comparing the matrix tables.

Further, instead of creating matrix tables, the controller 130 may combine the photographed user image frames and the photographed object image frames into different layers and determine one area among the overlapping area or the middle area between the user area and the position area to be the look-through area. In this case, whether the information overlaps with the look-through area can be confirmed by directly comparing the combined frames and the screen frame including the information.

Figure 6A:
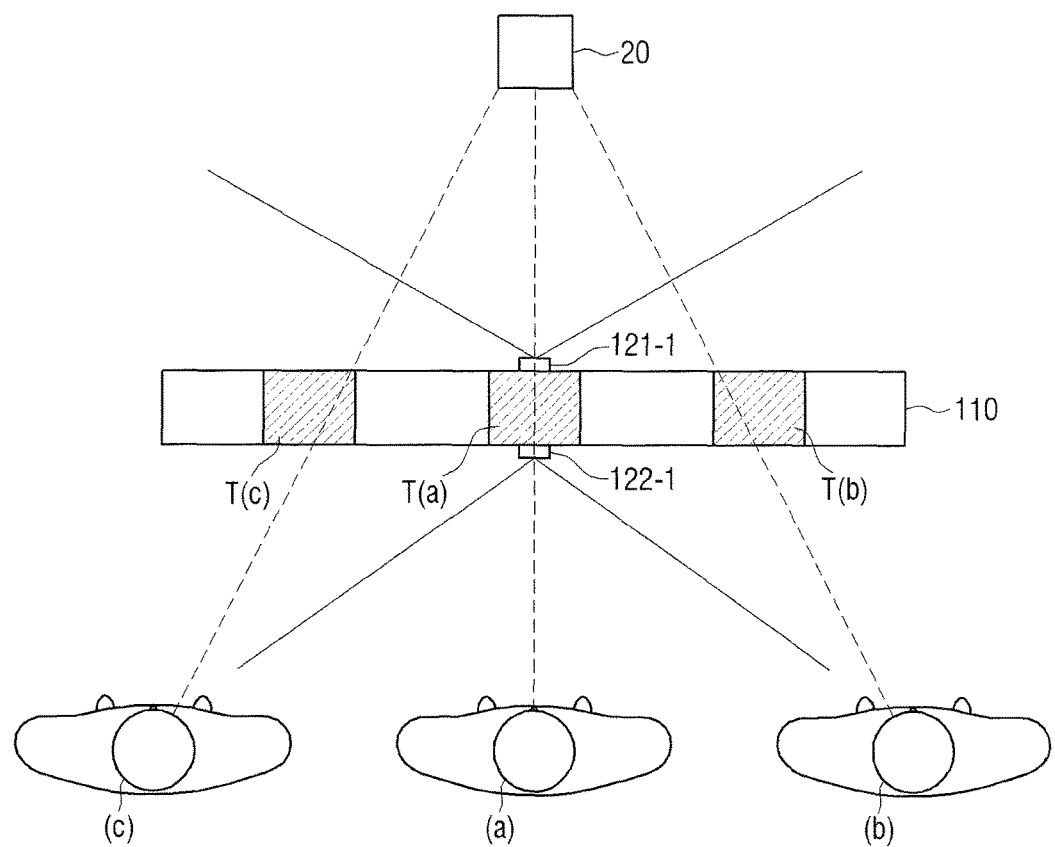
FIGS. 6A and 6B are overhead views provided to explain positions at which a first photographer and a second photographer are arranged according to an embodiment of the present disclosure.
Figure 6B:
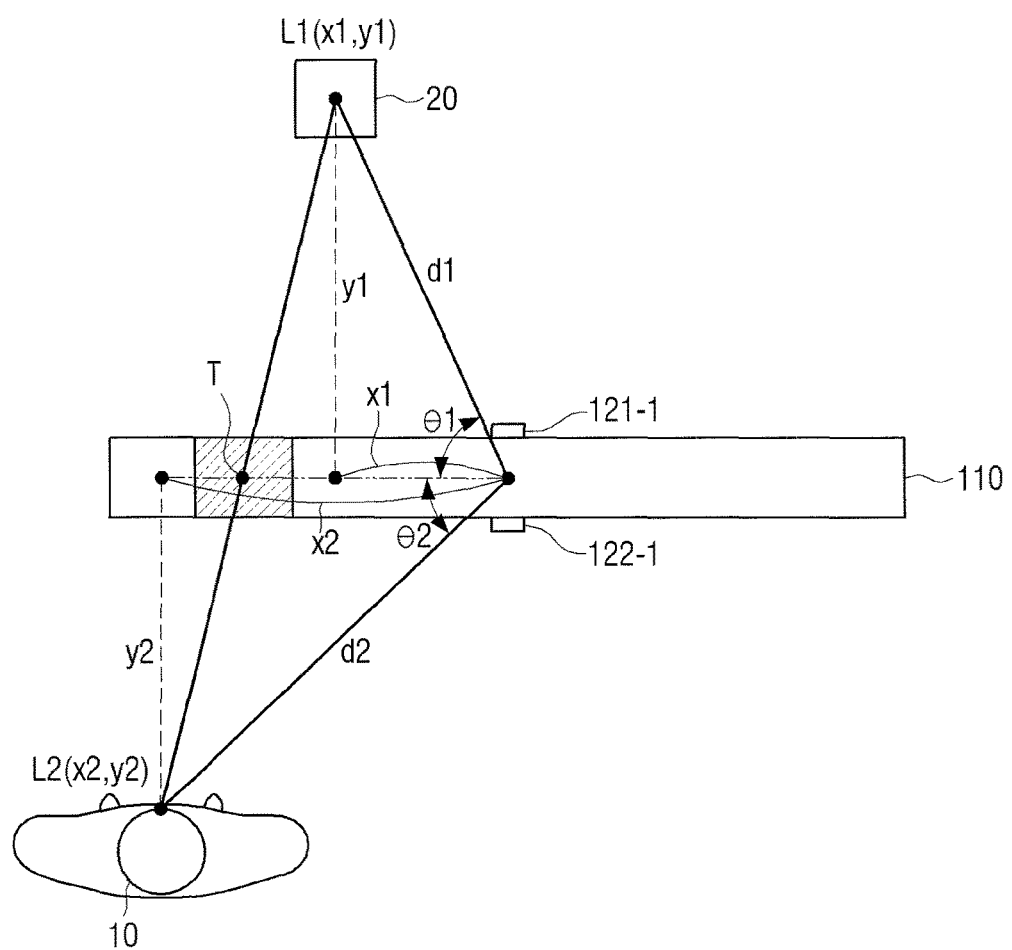

FIGS. 6A and 6B are overhead views provided to explain arrangement position of the first photographer 121-1 and the second photographer 122-1 according to an embodiment of the present disclosure.

Referring to FIGS. 6A and 6B, the first photographer 121-1 is attached to the side opposite to the user and photographs the object 20. Meanwhile, the second photographer 122-1 is attached to the side of the user and photographs the user 10.

Referring to FIG. 6A, the first photographer 121-1 and the second photographer 122-1 are provided on the center of the each side of the transparent display apparatus 100.

When the user 10 is located at point (a), and the user 10 and the object 20 are arranged in series, the look-through area is formed on T(a) point where a line connecting the user 10 and the object 20 meets the transparent display 110 in the transparent display apparatus 100. Thus, the transparent display apparatus 100 marks the information on an area other than the look-through area, T(a).

Meanwhile, because the transparent display apparatus 100 shows the object 20 transparently as it is, position and shape of the image which the object 20 is formed on the transparent display 110 become different with each other according to the user position even if the object 20 is located on the fixed position. Thus, when the user is located at point (b) in FIG. 6A, the look-through area is formed at point T(b). When the user is located point (c) in FIG. 6A, the look-through area is formed point T(c). Further, if the object 20 has a cubic shape, when the user is located at point (a) and the eye height is the same as the object 20, the object 20 can be viewed as cubic shape. However, when the user is located at point (b) or point (c), the object 20 may be viewed as a rectangle or a diamond shape. Thus, the perceptible area of the object 20 needs to be correctly extracted according to a change of the user position.

Referring to FIG. 6B, an overhead view illustrates calculating the look-through area based on the user position and the object position. Specifically, FIG. 6B illustrates estimating the perceptible area of the object 20 by using the trigonometrical functions even if the user position changes. Further, if the distance from the object and the arrangement angle are measured by using a depth camera or a distance sensor, and the perceptible area of the object 20 is estimated by using the measured values.

Referring to FIG. 6B, the first photographer 121-1 and the second photographer 122-1 may be respectively built on the center of the upper side, similar to FIG. 6A. When arrangement positions of the first photographer 121-1 and the second photographer 122-1 are positioned with respect to each other, and when assuming that the center point is zero point (0, 0), the position of the object 20 is L1(x1, y1) and the position of the user 10 is L2(x2, y2).

When the first photographer 121-1 and the second photographer 122-1 are respectively implemented to be depth cameras, the first extractor 121-2 may extract an object distance d1 and an angle θ1 between the object direction and the surface of the transparent display apparatus 100 by using the rear image photographed in the first photographer 121-1. Further, the second extractor 122-2 may extract a user distance d2 and an angle θ2 between the user direction and the surface of the transparent display apparatus 100 by using the front image photographed in the second photographer 122-1.

The controller 130 may respectively calculate x1, y1, x2, y2 by using the trigonometrical functions. Thus, d1*sin θ1=y1 and d1*cos θ1=x1. Further, d2*sin θ2=y2 and d2*cos θ2=x2. When x1, y1, x2, y2 are calculated, a line equation to connect L1 and L2 is obtained. Thus, the equation such as y=(y1−y2)*x/(x1−x2)+y1−(y1−y2)*x1/(x1−x2) may be obtained. Therefore, area where the object is viewed from the transparent display 110, i.e., T may be calculated to be ((x2y1−x1y2)/(y1−y2), 0). Therefore, the controller 130 may move the information to be displayed on the calculated T point toward a surrounded area that does affect the perceptibility of the information.

Although FIG. 6B describes that T point is one coordinate value, this is merely one of the various embodiments for convenient explanation. All the areas within a certain distance based on T point may be estimated to be a look-through area by using the object size and the line distance between the user and the object.

Although FIGS. 6A and 6B illustrate that the first and the second photographers 121-1, 122-1 are provided as a single device, each photographer may be provided by plural devices. Thus, when the photographer is provided with a plurality of units, the discriminating area of the object can be estimated by using one photographer corresponding to the moving direction of the position when the user moves his position. Thereby, estimating the perceptible area can be performed more correctly.

FIGS. 7A, 7B, 7C, 7D, 8, 9, 10A, 10B, 10C, 11A, 11B, 11C, and 11D are illustrations provided to explain a display method according to an embodiment of the present disclosure.

Referring to FIGS. 7A, 7B, 7C, and 7D, a window includes the transparent display apparatus 100.

Specifically, in FIGS. 7A, 7B, 7C, and 7D, the transparent display apparatus 100 may sense illumination intensity in the first and the second directions based on the transparent display apparatus 100. For example, the first direction and the second direction may be interior and exterior, respectively.

Figure 7A:
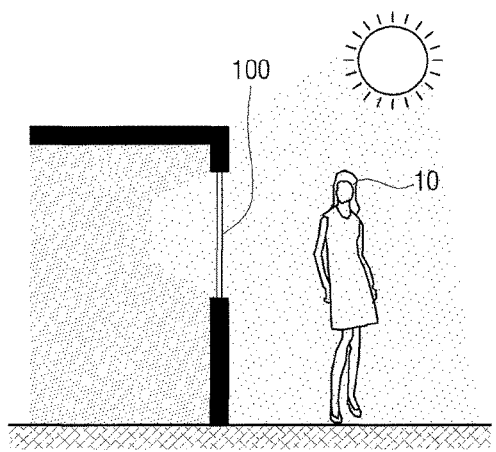
Figure 7B:
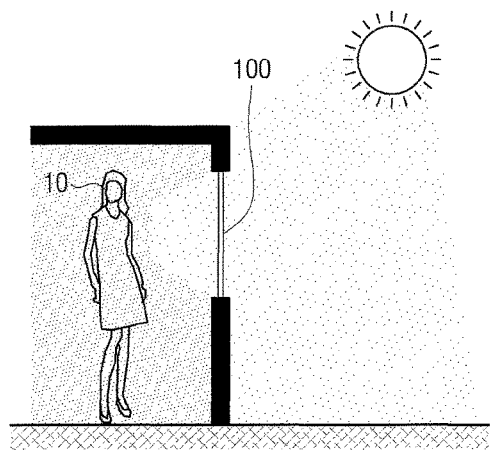

First, FIG. 7A and FIG. 7B illustrate that the exterior illumination intensity is higher while the interior illumination intensity deteriorates, and the transparent display apparatus 100 is implemented to be spontaneous emission elements such as OLED.

As illustrated in FIG. 7A, when the user 10 is viewing the window displaying information from the exterior, there may be no need to adjust the brightness of OLED elements where the information is displayed because the interior illumination intensity deteriorates.

However as illustrated in FIG. 7B, when the user 10 is viewing the window displaying information in the interior, the displayed information may not be clearly recognized if brightness of OLED elements becomes great because the exterior illumination intensity is higher. In this case, the displayed information can be viewed more clearly to the user by reducing brightness of OLED elements corresponding to the area or darkening color.

Figure 7C:
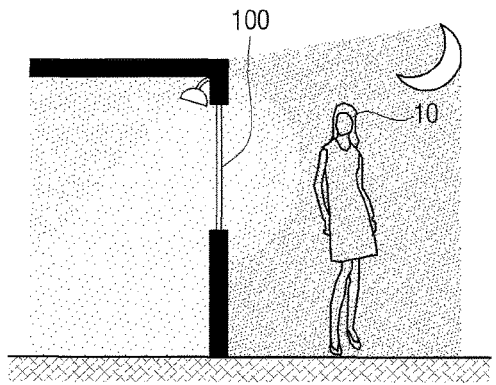
Figure 7D:
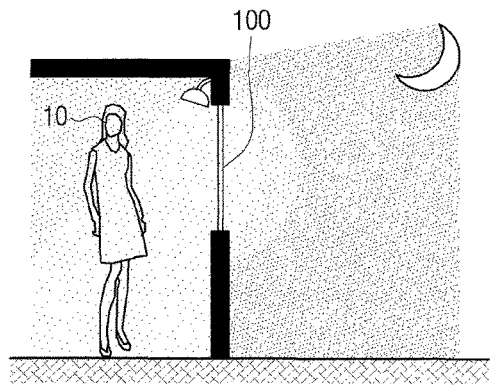

Further, FIG. 7C and FIG. 7D illustrate that the exterior illumination intensity deteriorates while the interior illumination intensity is higher, and the transparent display apparatus 100 is implemented with backlight elements such as LCD.

Meanwhile, as illustrated in FIG. 7C, when the user 10 is viewing the window displaying information in the exterior, there may be no need to greatly adjust brightness of the backlight on pixel areas where the information is displayed because the interior illumination intensity is higher.

However, as illustrated in FIG. 7D, when the user 10 is viewing the window displaying information in the interior, the displayed information on the window may not be clearly recognized because the exterior illumination intensity deteriorates. In this case, the displayed information can be viewed more clearly to the user by increasing brightness of the backlight on corresponding area.

Figure 8:
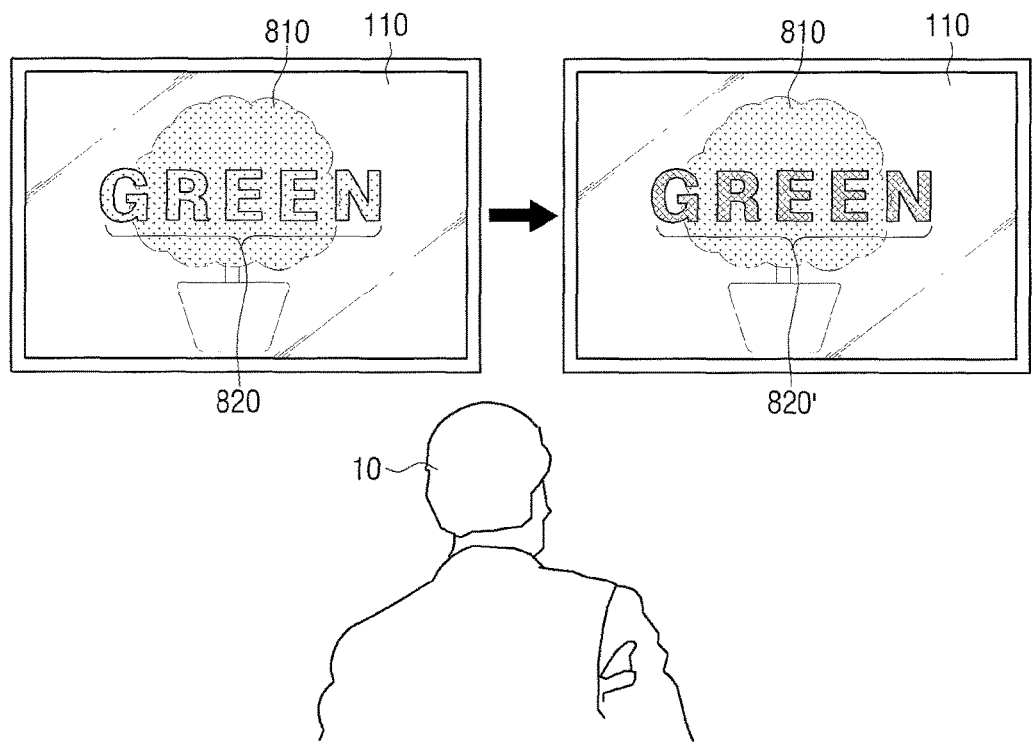

FIG. 8 illustrates another view provided to explain the display method according to another embodiment of the present disclosure.

Referring to FIG. 8, an object 810 is located behind the transparent display and a user is viewing the displayed information on the front side of the transparent display.

As illustrated in the left region of FIG. 8, when colors of the object 810 are uniform or similar to colors of information 820 that is presently displayed on the transparent display 110, the displayed information 820 may not be clearly recognized to the user.

In this case, as illustrated in the right region of FIG. 8, the colors of the displayed information 820' may be modified into different colors from those of the object located on the back side, and displayed. For example, if the color of the object 810 is primarily green, the displayed information 820' may be modified into red, which is complementary to the green, and displayed.

Figure 9:
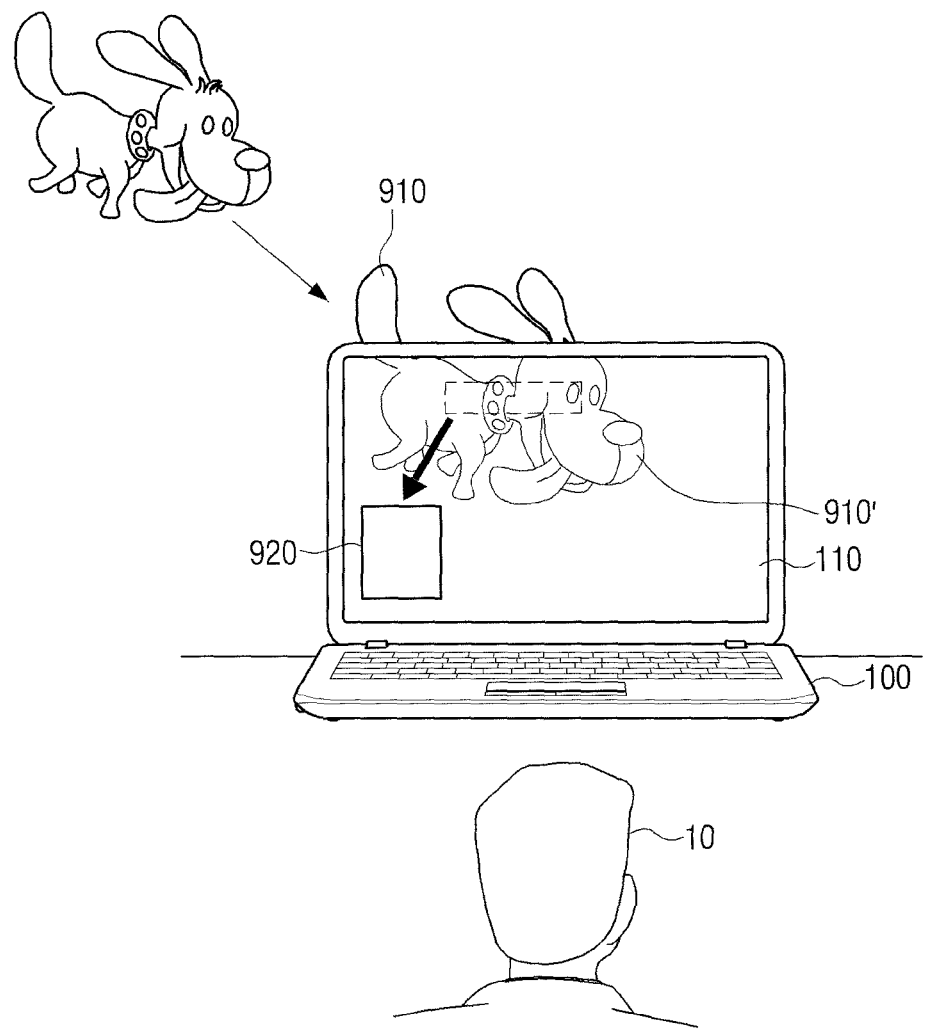

FIG. 9 is a view provided to explain the display method according to another embodiment of the present disclosure.

As illustrated in FIG. 9, information 920 may be displayed on the transparent display 110 by modifying position of the displayed information 920 according to position 910' where an object 910 located behind the transparent display 110 is perceptible on the transparent display 110.

Figure 10A:
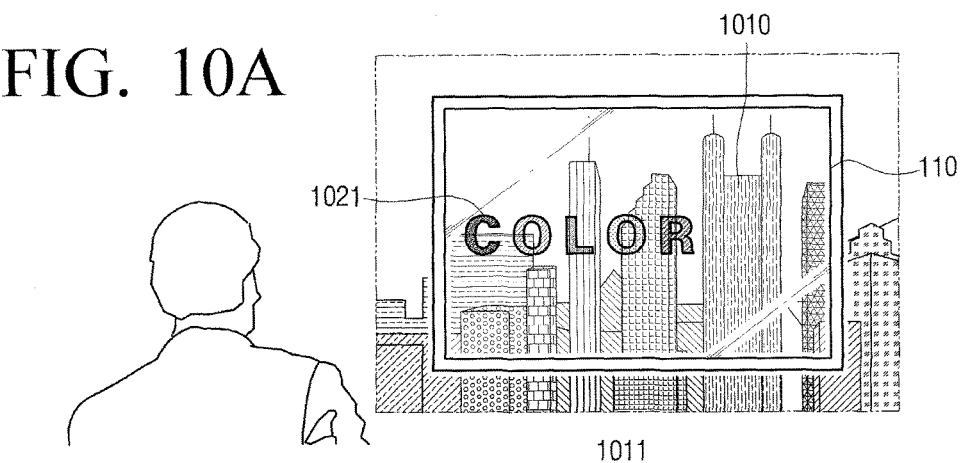
Figure 10B:
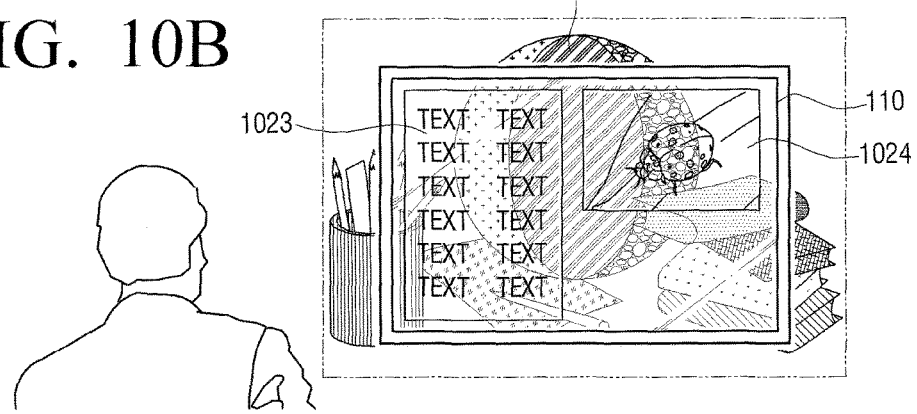
Figure 10C:
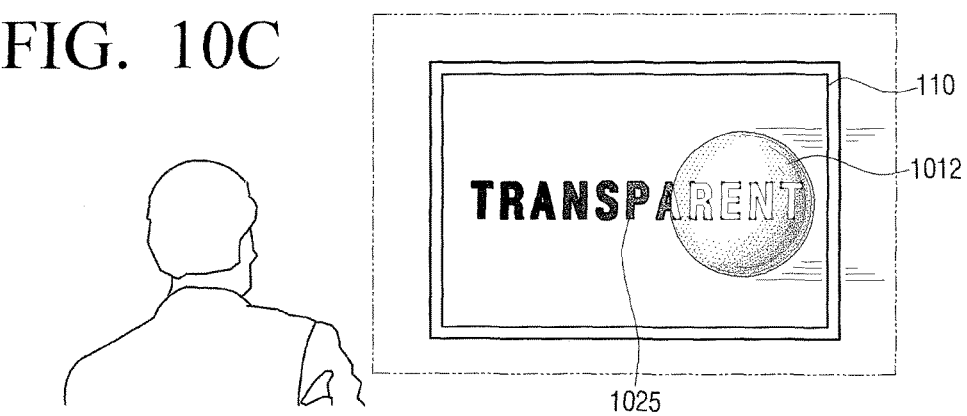

FIGS. 10A, 10B, and 10C are views provided to explain the display method according to various embodiments of the present disclosure.

Referring to FIG. 10A, an object 1010 located on the back side of the transparent display is transparently observed and colors of corresponding object 1010 are diversified.

In this case, information 1021 displayed on the transparent display 110 may be displayed with varying colors according to the varying colors of the object 1010 or one color that can be most clearly recognized as an average value of the varying colors of the object 1010. For example, colors of a character "C" may be determined by considering the colors of the object in the displayed area of "C" and colors of a character "O" may be determined by considering the colors of the object in the displayed area of "O".

Further, although not illustrated in the drawings, corresponding information 1021 may be displayed by calculating the color that can be most clearly recognized as an average value of the varying colors of the object 1010.

Referring to FIG. 10B, an object 1011 located on the back side of the transparent display is observed and the shape and the color of corresponding object 1011 are diversified.

In this case, the displayed information 1011 on the transparent display 110 may be modified into a shape that can be easily recognized to a user and displayed. For example, if the user can clearly recognize that information is marked in a text format according to the shape and the color of the object 1011, the information may be marked in the text format 1023. If the user can clearly recognize that information is marked in an image format, the information may be marked in the image format 1024.

Referring to FIG. 10C, an object located on the back side of the transparent display is observed, and a corresponding object 1021 is moving.

As illustrated in FIG. 10C, when the position of the object 1012 changes and is observed on the transparent display 110, the transparent display 110 may modify a display state of the displayed information 1025 according to movement state of corresponding object 1012. For example, colors of the displayed information 1025 are modified on areas where the object is observed according to the colors of the object 1012 so that the displayed information 1023 can be clearly recognized to a user.

FIGS. 11A, 11B, 11C, and 11D are views provided to explain the display method according to another embodiment of the present disclosure.

As explained below, an image 1120 of FIG. 11B is displayed on the transparent display 110 where the rear background 1110 is observed as illustrated in FIG. 11A.

In this case, as illustrated in FIG. 11C, the image 1120 displayed on the transparent display 110 may not be clearly recognized to a user according to colors of the rear background 1110.

Thus, brightness (or colors) of the displayed image 1120' may be adjusted and displayed based on the colors of the rear background 1110.

Meanwhile, when the transparent display 110 is implemented to be the transparent OLED in the above various embodiments, each pixel of the contents playing screen is expressed by turning on or off the transparent thin film transistor included on each cell within the transparent display 110 according to generated information or contents playing screen. As explained in the above various embodiments, if display attributes of the information are requested to be modified, the controller 130 may modify features displayed on corresponding pixel by using the renderer and the scaler. Further, when display position of the information is requested to be moved, the controller 130 may differently modify pixel coordinate values of the displaying pixels.

FIG. 12 is a flowchart illustrating a method of the transparent display apparatus according to an embodiment of the present disclosure.

Referring to FIG. 12, background information of the first direction may be sensed based on the transparent display which displays information at operation S1210.

At operation S1220, a display state of the displayed information is modified and displayed based on the sensed background information.

In this case, the display state of the information may be at least one of display attributes and display position regarding the information.

Further, the sensing background information at operation S1210 may sense illumination intensity in the first direction or illumination intensity in the first and the second directions. Herein, the second direction may be a direction of a user with reference to the transparent display, and the first direction may be a direction opposite to the user, i.e., a direction where the background is transparently observed from a view point of the user. In this case, the displaying information at operation S1220 may adjust and display at least one from among brightness values and color values of pixel areas corresponding to the displayed information on the transparent display based on the sensed illumination intensity state.

Further, at operation S1210, sensing background information may photograph the object located in the first direction. At operation S1220, displaying information may adjust and display at least one from among brightness values and color values of pixel areas corresponding to the displayed information on the transparent display based on color information of the object included in the photographed image.

Further, the sensing of background information at operation S1210 may sense a position of the object located in the first direction and a position of the user located in the second direction. The displaying of information at operation S1220 may estimate an area where the object is looked through on the transparent display from the user position, adjust and display at least one from among brightness values and color values of pixel areas corresponding to the displayed information on the estimated area where the object is looked through.

Further, when the sensed object position changes at operation S1210, an area where the moved object is looked through on the transparent display may be estimated from the user position, and an adjustment may be made to at least one from among brightness values and color values of pixel areas corresponding to the displayed information on the estimated area where the object is looked through.

Further, the sensing background information at operation S1210 may photograph the object located in the first direction, and, during the displaying of information at operation S1220, may modify and display position of the displayed information on the transparent display based on color information of the object included in the photographed image.

As described above, according to various embodiments, the displayed information on the transparent display can be more efficiently delivered based on the rear background information.

Meanwhile, the methods according to the various embodiments may be programmed and stored in various types of storing medium. Thereby, the above described various methods may be implemented in various types of electronic devices implementing storing medium.

Specifically, according to an embodiment, a non-transitory computer readable recording medium may be provided, storing programs which implement sensing background information in the first direction with reference to the transparent display which displays information, and modifying a display state of the displayed information based on the sensed background information.

The non-transitory computer readable recording medium is a medium which stores data and can be read by devices to perform instructions contained therein. Specifically, the above various applications or programs may be stored and provided in non-transitory computer readable recording medium such as a Compact Disc (CD), a Digital Video Disc (DVD), a hard disk, a Blu-ray disk, a Universal Serial Bus (USB) storage medium, a memory card, or a ROM.

Further, the foregoing various embodiments and advantages are merely exemplary and are not to be construed as limiting the various embodiments. The present disclosure can be readily applied to other types of apparatuses. Also, the description of the various embodiments of the present inventive concept is intended to be illustrative, and not to limit the scope of the claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus, comprising:
    a projector;
    a sensor configured to sense a position and color information of an object located in a direction from a transparent screen; and
    at least one processor configured to control the projector to project information on the transparent screen in a color different from a color of the object based on the color information of the object if the information is projected on an area of the transparent screen, where the object is viewed through the transparent screen.

2. The display apparatus of claim 1,
    wherein the sensor further comprises an illumination intensity sensor configured to sense illumination intensity in the direction, and
    wherein the at least one processor is further configured to adjust at least one of brightness values and color values of pixel areas corresponding to the projected information based on the sensed illumination intensity state.

3. The display apparatus of claim 2, wherein the direction is behind the display apparatus with respect to a user.

4. The display apparatus of claim 1,
    wherein the sensor comprises a photographing sensor configured to photograph an object located in the direction, and
    wherein the at least one processor is further configured to adjust at least one of brightness values and color values of pixel areas corresponding to the projected information based on color information of the object.

5. The display apparatus of claim 1, wherein the at least one processor is further configured to:
    estimate an area where the object is observed on the transparent screen based on the sensed object position and a user position, and
    adjust at least one of brightness values and color values of pixel areas corresponding to the projected information on the estimated area.

6. The display apparatus of claim 5, wherein the at least one processor is further configured to:
    estimate an area where the moved object is observed from the user position when the sensed object position is changed, and
    adjust at least one of brightness values and color values of pixel areas corresponding to the projected information on the estimated area.

7. The display apparatus of claim 1,
    wherein the sensor comprises a photographing sensor configured to photograph an object located in the direction, and
    wherein the at least one processor is further configured to control the projector to project the information on the transparent screen in a position different from a position of the object viewed through the transparent screen based on color information of the object in the photographed image.

8. The display apparatus of claim 1, wherein the transparent screen is included in the display apparatus.

9. A method of controlling a display apparatus, the method comprising:
    sensing a position and color information of an object located in a direction from a transparent screen; and
    projecting information on the transparent screen,
    wherein the projecting of the information comprises projecting the information on the transparent screen in a color different from a color of the object based on the color information of the object if the information is projected on an area of the transparent screen, where the object is viewed through the transparent screen.

10. The method of claim 9,
wherein the sensing of the position and color information of the object comprises sensing illumination intensity in the direction, and
wherein the projecting of the information comprises adjusting at least one of brightness values and color values of pixel areas corresponding to the projected information based on the sensed illumination intensity state.

11. The method of claim 10, wherein the direction is behind the display apparatus with respect to a user.

12. The method of claim 9,
wherein the sensing of the position and color information of the object comprises photographing the object located in the direction, and
wherein the projecting of the information comprises adjusting at least one of brightness values and color values of pixel areas corresponding to the projected information based on color information of the object in a photographed image.

13. The method of claim 12, wherein the projecting of the information includes:
estimating an area where the object is observed on the transparent screen based on the sensed object position and a user position; and
adjusting and projecting at least one of brightness values and color values of pixel areas corresponding to the projected information on the estimated area.

14. The method of claim 13, further comprising:
estimating an area where the moved object is observed from the user position when the sensed object position is changed; and
adjusting at least one of brightness values and color values of pixel areas corresponding to the projected information on the estimated area.

15. The method of claim 9,
wherein the sensing of the position and color information of the object comprises photographing an object located in the direction, and
wherein the projecting of the information includes modifying a projection position of the projected information based on color information of the object in a photographed image.

16. A non-transitory computer-readable storage medium storing instructions that, when executed, cause at least one processor to perform the method of claim 9.

17. A display apparatus, comprising:
a display;
a photographing sensor configured to photograph an object located in a direction; and
at least one processor configured to control the display to display information on the display in a color different from a color of the object included in an image photographed by the photographing sensor based on color information of the object, if the information is displayed on an area of the display, where the object is located on the image.

* * * * *